United States Patent [19]

Bolduc et al.

[11] Patent Number: 6,157,841
[45] Date of Patent: *Dec. 5, 2000

[54] CELLULAR PHONE NETWORK THAT PROVIDES LOCATION-BASED INFORMATION

[75] Inventors: Raymond L. Bolduc, Morganville; Kenneth H. Rosen, Middletown; Steven Charles Salimando; Peter H. Stuntebeck, both of Little Silver; Roy Philip Weber, Bridgewater, all of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,516

[22] Filed: Sep. 18, 1997

[51] Int. Cl.[7] .................................................. H04Q 7/26
[52] U.S. Cl. .................... 455/456; 455/457; 455/404; 455/422
[58] Field of Search ..................... 455/456, 404, 455/412, 414, 422; 379/216

[56] References Cited

U.S. PATENT DOCUMENTS

| | | | |
|---|---|---|---|
| 4,839,919 | 6/1989 | Borges et al. ...................... | 379/93.23 |
| 5,539,395 | 7/1996 | Buss et al. ............................... | 340/827 |
| 5,602,901 | 2/1997 | Redden et al. .......................... | 455/404 |
| 5,732,074 | 3/1998 | Spaur et al. ............................. | 370/313 |
| 5,742,666 | 4/1998 | Alpert ..................................... | 455/404 |
| 5,852,775 | 12/1998 | Hidary ..................................... | 455/404 |
| 5,946,618 | 8/1999 | Agre et al. .............................. | 455/428 |
| 5,950,125 | 9/1999 | Burhmann et al. ..................... | 455/422 |

Primary Examiner—Daniel S. Hunter
Assistant Examiner—Alan T. Gantt

[57] ABSTRACT

A cellular phone network provides location-based information to a user of a cellular phone. The cellular phone network includes a plurality of antennas coupled to at least one server. The server is coupled to a database. Stored on the database is a plurality of location-based information that is indexed to the plurality of antennas. The cellular phone transmits communication signals to one of the antennas. A phone call is established between the server and the user, and the server receives an identification of the antenna that the user transmits to. The server then queries the database and retrieves information local to the user. This information is then presented to the user in the form of menus.

17 Claims, 2 Drawing Sheets

CELLULAR PHONE NETWORK THAT PROVIDES LOCATION-BASED INFORMATION

FIELD OF THE INVENTION

The present invention is directed to a cellular phone network. More particularly, the present invention is directed to a cellular phone network that provides location-based information.

BACKGROUND OF THE INVENTION

People traveling in unfamiliar cities or towns frequently desire location-based information. For example, a person traveling in a vehicle on an interstate in an unfamiliar area may desire to receive information about local places of interest such as the nearest restaurants, hotels, gas stations, etc., or directions on how to get to local places of interest. Billboards and local radio stations may provide some of this information. However, billboards and local radio stations do not allow a person to choose what information is received, or when the information is received. Another option available to a traveler is to use a local phone book to obtain local information. However, this requires the traveler to exit off the interstate and find a phone book.

Meanwhile, an increasing number of people have access to cellular phones. Cellular phone networks, which include personal communication system ("PCS") networks and other mobile phone networks, provide access to telephone networks over virtually the entire industrialized world. Therefore, many people that travel to unfamiliar towns and cities take a cellular phone with them. The cellular phone can be used is to contact an operator who can provide some local information including phone numbers of places of interest, but the traveler must usually know in advance the names of the places of interest.

Based on the foregoing, it would be desirable to have a cellular phone network that provides location-based information in an easy to use manner to users of cellular phones.

SUMMARY OF THE INVENTION

One embodiment of the present invention is a cellular phone network that provides location-based information to a user of a cellular phone. The cellular phone network includes a plurality of antennas coupled to at least one server. The server is coupled to a database. Stored on the database is a plurality of location-based information that is indexed to the plurality of antennas.

The cellular phone transmits communication signals to one of the antennas. A phone call is established between the server and the user, and the server receives an identification of the antenna which the user is transmitting to. The server then queries the database and retrieves information local to the user. This information is then presented to the user in the form of menus.

DETAILED DESCRIPTION

Figure 1:
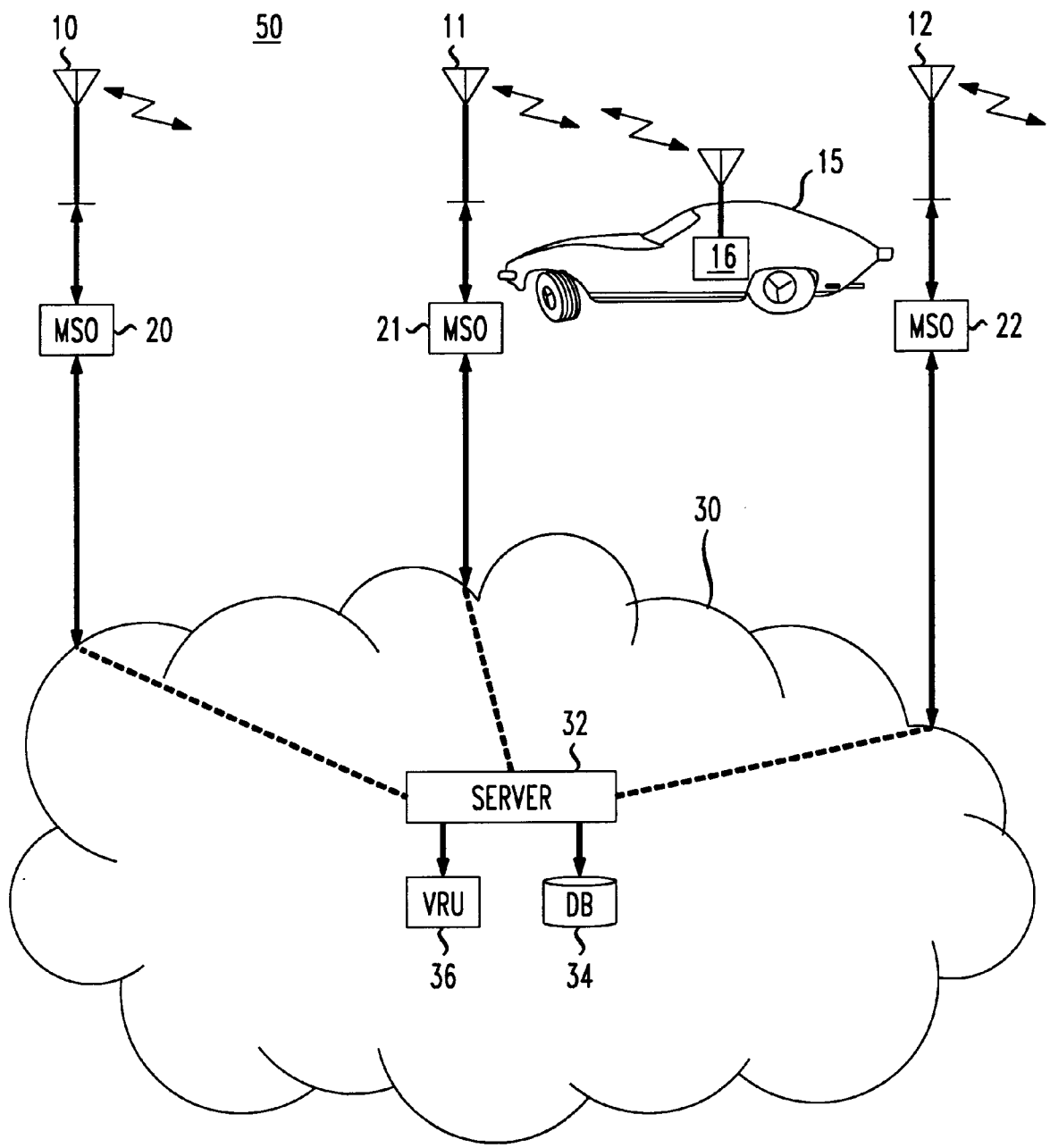
FIG. 1 illustrates an exemplary cellular phone network that implements one embodiment of the present invention.

One embodiment of the present invention is a cellular phone network that provides location-based information to users of cellular phones. FIG. 1 illustrates an exemplary cellular phone network 50 that implements one embodiment of the present invention. Cellular phone network 50 shown in FIG. 1 includes a plurality of cellular towers or antennas 10-12. Antennas 10-12 send and receive data and voice communications to users of cellular network 50 via cellular telephones. Although only three antennas are illustrated in FIG. 1, cellular phone network 50 can be implemented with many more antennas so that it operates, for example, throughout the entire United States.

Each antenna 10-12 is coupled to a mobile switching office ("MSO") 20-22, respectively, through a land line. Each MSO 20-22 is a cellular switch that routes phone calls transmitted by users of cellular network 50 through antennas 10-12 to a land-based phone network 30. Phone network 30 is any network that allows a calling party to initiate and complete a telephone call to a called party. In one embodiment of the present invention, phone network 30 is the public switch telephone network ("PSTN"). Network 30 includes a plurality of network nodes that route calls through the network 30.

One network node included within network 30 comprises a server 32 coupled to a database 34 and a voice response unit 36. Database 34 stores location-based information is that is associated with each antenna 10-12 in cellular phone network 50. Database 34 can comprise a single database, or multiple databases. Examples of location-based information stored in database 34 include information regarding hotels, restaurants, gas stations and other merchants that are geographically located near each antenna 10-12, directions on how to get to places of interest that are geographically located near each antenna 10-12, and information regarding other destinations that are of interest to a traveler near a particular antenna 10-12 (e.g., tourist information for an entire state in which an antenna is located). Voice response unit 36 enables a user to input commands to server 32 using voice commands.

A user in a vehicle 15 can participate in a telephone call over cellular network 50 via a cellular phone 16. Cellular phone 16 automatically sends and receives communication signals via the geographically closest antenna, i.e., antenna 11. Other users of cellular phone network 50 may be pedestrians using hand held cellular phones. As with cellular phone 16, a hand held cellular phone normally sends and receives communication signals via the geographically closest antenna (cellular phone 16 may also be a hand held cellular phone).

In order to receive location-based information from cellular network 50 via server 32, users of the present invention in one embodiment dial a universal number (e.g., "*local") on cellular phone 16. When this number is dialed and received by the nearest antenna, the call is automatically routed to server 32 by the MSO 20-22 associated with the antenna. In another embodiment of the present invention, a unique phone number exists for each town or city offering location-based information. In this embodiment, the unique phone number can be advertised, for example, on a billboard that can be viewed by a user in vehicle 15. When the phone number is dialed by the user using cellular phone 16, the call is routed to server 32 by the MSO 20-22 associated with the nearest antenna 10-12.

Figure 2:
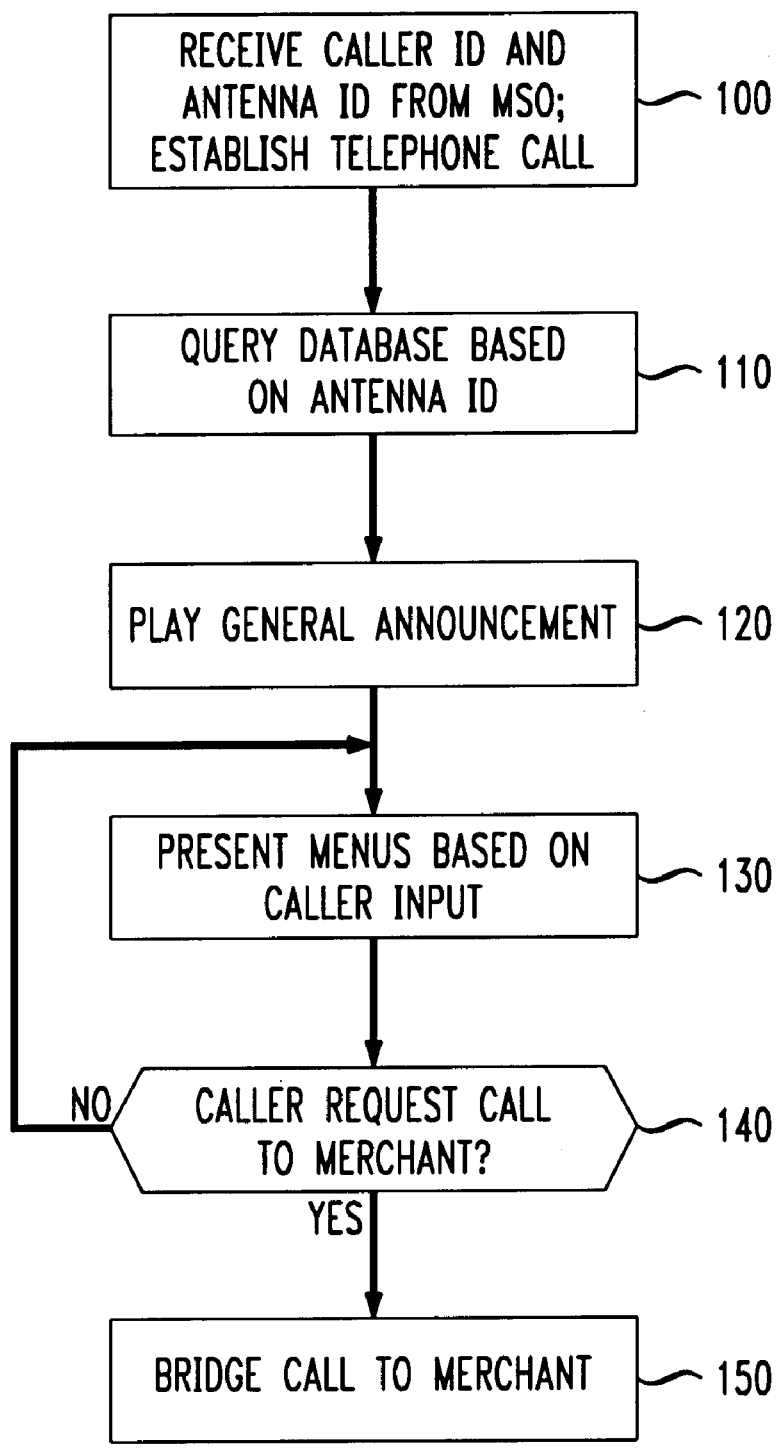
FIG. 2 is a flow chart illustrating the steps performed by a server in one embodiment of the present invention.

FIG. 2 is a flow chart illustrating the steps performed by server 32 in one embodiment of the present invention when a call initiated by a caller to the location-based information phone number is routed from one of the MSOs 20-22. At step 100, server 32 receives both the caller's identification ("ID") and an antenna ID from the MSO. The antenna ID identifies which antenna 10-12 the call is initiated from (i.e., which antenna 10-12 is geographically closest to the user of the cellular phone when the call is initiated). Server 32 then establishes a telephone call between server 32 and the caller.

At step 110, server 32 queries database 34 based on the antenna ID. The location-based information stored in database 34 in one embodiment is indexed to the antenna IDs. Therefore, the query produces merchants and other information local to each antenna 10-12, and consequently local to the caller.

At step 120, a general announcement is played providing the user with instructions on how to interact with server 32 and an introduction to the location-based information that will be presented.

At step 130, one or more menus are presented to the caller. In one embodiment, the menus are nested and different menus are presented based on caller input. For example, the first menu can present a list of categories of location-based information that is available (i.e. gas stations, restaurants, hotels, events and directions). The caller can then input a category to receive more information about a category, or an additional sub-menus. The input can be either a voice response input, which utilizes voice response unit 36, or the caller can provide input by pressing keys on cellular phone 16. For example, the caller can select the "hotels" category. Server 32 then presents a menu of local hotels to the caller. The caller can select one of the hotels, and an additional sub-menu may be presented that includes categories regarding the selected hotel (e.g., reservations, vacancy information, general information, directions, etc.). Further sub-menus may also be presented.

The presentation of menus to the caller at step 130 may also be based on the antenna ID. For example, the same location-based information may be associated with a plurality of antennas. However, the order that the location-based information is presented in menu form may depend on the specific antenna ID. For example, antenna 11 may be located along a major interstate highway. Therefore it is likely that a caller using the present invention via antenna 11 is located in a car. Therefore, initially information such as gas stations, hotel information and directions will be presented to the caller at step 130. Similarly, antenna 12 might be located on top of a building in a city. A caller using the present invention via antenna 12 is likely a pedestrian on a city street located near the building. Therefore, initially information regarding the building that antenna 12 is located on, and then local restaurant information might be presented to the caller at step 130. Information regarding local gas stations and hotels might be delegated to the end of the menu selections because these will least likely be of interest to pedestrians.

When specific merchants such as gas stations, hotels, restaurants, etc. are presented to the caller at step 130, the caller at step 140 can at any time interrupt or "barge in" to request the initiation of a call to that merchant. If the caller does not barge in at step 140 the menus are continuously presented based on caller input at step 130. However, if at step 140 the caller barges in to request a call to a merchant, at step 150 server 32 bridges a call to the merchant. This enables the caller to talk directly to the merchant. The caller can then, for example, make a reservation at a selected hotel or restaurant, or receive live directions to a local merchant.

In one embodiment of the present invention, database 34 can be easily updated or revised by the local merchants. The updates can be performed by, for example, allowing the merchants to directly dial-in to server 32 and modify database 34, or by having the merchants send an electronic mail message to server 32. Therefore, for example, hotel operators can update vacancy information so that callers will receive the latest vacancy information regarding the hotels from server 32.

The location-based information stored on database 34 can be in the form of a Hypertext Markup Language ("HTML") document similar to "Web" pages found on the Internet. In one embodiment, the HTML documents include parameters or are written using audio HTML (sometimes referred to as "phone markup language") so that the information included in the documents can be converted to audio form and accessed by a user of cellular phone 16 with an audio-only output. In another embodiment, cellular phone 16 includes a text display, and therefore textual information in the HTML document can be directly read on cellular phone 16. By storing location-based information as HTML documents, the same HTML documents can be used in the present invention and by an Internet user. Therefore, because location-based information is already stored in the form of Web pages (e.g., many cities and towns have existing Web pages that provide location-based information) this existing location-based information can comprise database 34 and be accessed by server 32.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although a single server 32 and data base 34 is illustrated, multiple servers 32 and data bases 34 may be used to provide location-based information for all available antennas in a cellular phone network. Further, the order that the location-based information is presented to each user may be varied based on stored preferences of each user. These preferences are stored at server 32.

What is claimed is:

1. A wireless network comprising:
   a plurality of antennas;
   a server coupled to said plurality of antennas;
   a database coupled to said server, said database having stored thereon a first plurality of location-based information indexed to said plurality of antennas;
   wherein said server is programmed to present a second plurality of location-based information retrieved from a query of the database by the server to the user; and
   wherein the second plurality of location-based information comprises a plurality of names of merchants local to the user, and wherein said server is programmed to bridge an existing phone call to one of the merchants.

2. The wireless network of claim 1, further comprising a plurality of mobile switching offices coupled to said plurality of antennas and said server.

3. The wireless network of claim 2, wherein a user of the wireless network transmits communication signals to one of said antennas, and wherein one of said mobile switching offices sends an identification of said one antenna to said server.

4. The wireless network of claim 1, wherein said server is programmed to present the second plurality of location based-information in response to said network receiving a pre-determined dialed number from a user, the dialed number indicating a request for location-based information.

5. The wireless network of claim 1, wherein said second plurality of location-based information is presented to the user via a display.

6. A method of operating a wireless network that includes a plurality of antennas, wherein a mobile phone of a user of the wireless phone network transmits communication signals to one of the plurality of antennas, said method comprising the steps of:

(a) receiving a first identification of the one antenna;

(b) querying a database using said first identification;

(c) presenting location-based information retrieved from the database to the user in response to the query, wherein the location-based information comprises a plurality of names of merchants;

(d) determining whether the user has requested a call to one of the merchants; and (e) bridging an existing call to one of the merchants.

7. The method of claim 6, further comprising the steps of:

(f) receiving a pre-determined dialed number from the user, the dialed number indicating a request for location-based information.

8. The method of claim 6, wherein said step of presenting includes presenting the location-based information to the user via a display.

9. A method of providing access to a plurality of merchants for a user of a mobile phone comprising the steps of:

(a) storing a first plurality of merchant names on a database, wherein the first plurality of merchant names are indexed to a plurality of locations of the mobile phone;

(b) receiving a location identification of the mobile phone;

(c) querying the database using the location identification; and (d) presenting a second plurality of merchant names to the user in response to the query;

(e) determining whether the user has requested a call to one of the second plurality of merchant names; and (f) bridging an existing call to a merchant associated with the one of the second plurality of merchant names.

10. A wireless network comprising:

a plurality of antennas;

a server coupled to said plurality of antennas;

a database coupled to said server, said database having stored thereon a first plurality of location-based information, the location-based information including a plurality of names of merchants, indexed to said plurality of antennas;

wherein said location-based information is automatically updatable using information from at least one of said plurity of merchants.

11. A method of operating a wireless network that includes a plurality of antennas, wherein a cellular phone of a user of the cellular phone network transmits communication signals to one of the plurality of antennas, said method comprising the steps of:

(a) receiving a first identification of the one antenna;

(b) querying a database using said first identification;

(c) presenting location-based information retrieved from the database to the user in response to the query, wherein the location-based information comprises a plurality of names of merchants, and wherein the location-based information is automatically updatable using information from at least one of said plurity of merchants.

12. A network node coupled to a wireless network that comprises a plurality of antennas, said network node comprising:

a server coupled to the plurality of antennas;

a database coupled to said server, said database having stored thereon a first plurality of location-based information, the location-based information including a plurality of names of merchants, indexed to the plurality of antennas; and wherein said location-based information is automatically updatable using information from at least one of said plurity of merchants.

13. A method of providing access to a plurality of merchants for a user of a mobile phone comprising the steps of:

(a) storing a first plurality of merchant names on a database, wherein the first plurality of merchant names are indexed to a plurality of locations of the mobile phone, and wherein said first plurality of merchant names is automatically updatable kusing information from at least one of said plurality of merchants (b) receiving a location identification of the mobile phone;

(c) querying the database using the location identification; and (d) presenting a second plurality of merchant names to the user in response to the query.

14. A wireless network comprising:

a plurality of antennas;

a server coupled to said plurality of antennas;

a database coupled to said server, said database having stored thereon a plurality of location-based information, the location-based information including a plurality of names of merchants, indexed to said plurality of antennas;

wherein said server, responsive to a user request for location-based information and wherein the location-based information is automatically updatable using information from at least one of said plurality of merchants, is programmed to send the user said location-based information using the database.

15. A method of operating a wireless network that includes a plurality of antennas, wherein a mobile phone of a user of the wireless network transmits communication signals to one of the plurality of antennas, said method comprising the steps of:

(a) receiving a user request for location-based information, the location-based information including a plurality of merchant names, and wherein said location-based information is automatically updatable using information from at least one of said plurality of merchants;

(b) querying a database based on said user request;

(c) presenting said location-based information retrieved from the database to the user in response to the query, wherein the location-based information comprises a plurality of names of merchants.

16. A network node coupled to a wireless network that comprises a plurality of antennas, said network node comprising:

a server coupled to the plurality of antennas;

a database coupled to said server, said database having stored thereon a first plurality of location-based information indexed to the plurality of antennas;

wherein said server is programmed to present a second plurality of location-based information retrieved from a query of the database by the server to the user; and wherein the second plurality of location-based information comprises a plurality of names of merchants local to the user, and wherein said server is programmed to bridge an existing phone call to one of the merchants.

17. The network node of claim 16, wherein a mobile phone of a user of the wireless network transmits communication signals to one of the plurality of antennas, and wherein said server receives an identification of the one antenna.

* * * * *